(12) United States Patent  (10) Patent No.: US 8,014,634 B1
Chan                      (45) Date of Patent:   Sep. 6, 2011

(54) METHOD AND SYSTEM FOR APPROVING DOCUMENTS BASED ON IMAGE SIMILARITY

(75) Inventor: Wesley T. Chan, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/686,281

(22) Filed: Jan. 12, 2010

Related U.S. Application Data

(63) Continuation of application No. 12/644,868, filed on Dec. 22, 2009, now abandoned, which is a continuation of application No. 10/841,833, filed on May 10, 2004, now Pat. No. 7,639,898.

(51) Int. Cl.
*G06K 9/54* (2006.01)
*G06K 9/68* (2006.01)

(52) U.S. Cl. .................................. 382/305; 382/218
(58) Field of Classification Search ............... 382/305, 382/181, 190, 209, 218; 358/403; 705/1.4; 707/1, 3, 4, 6
See application file for complete search history.

(56) References Cited

U.S. PATENT DOCUMENTS

| | | | |
|---|---|---|---|
| 5,636,346 A | 6/1997 | Saxe | |
| 5,642,502 A | 6/1997 | Driscoll | |
| 5,724,521 A | 3/1998 | Dedrick et al. | |
| 5,845,265 A | 12/1998 | Woolston | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,948,061 A | 9/1999 | Merriman et al. | |
| 5,974,398 A | 10/1999 | Hanson et al. | |
| 6,026,368 A | 2/2000 | Brown et al. | |
| 6,044,375 A | 3/2000 | Shmueli et al. | |
| 6,061,659 A | 5/2000 | Murray | |
| 6,067,570 A | 5/2000 | Kreynin et al. | |
| 6,078,866 A | 6/2000 | Buck et al. | |
| 6,223,163 B1 | 4/2001 | van Luchene | |
| 6,230,170 B1 | 5/2001 | Zellweger et al. | |
| 6,247,009 B1 | 6/2001 | Shiiyama et al. | |
| 6,253,189 B1 | 6/2001 | Feezell et al. | |
| 6,269,361 B1 | 7/2001 | Davis et al. | |
| 6,285,987 B1 | 9/2001 | Roth et al. | |
| 6,298,348 B1 | 10/2001 | Eldering | |
| 6,324,519 B1 | 11/2001 | Eldering | |

(Continued)

FOREIGN PATENT DOCUMENTS

EP    1 026 610 A2    8/2000

(Continued)

OTHER PUBLICATIONS

Collection of pages from www.overture.com, printed on Jul. 29, 2003.

(Continued)

*Primary Examiner* — Yon Couso

(74) *Attorney, Agent, or Firm* — Fish & Richardson P.C.

(57) ABSTRACT

A system and method for comparing graphical content (e.g., images) of documents for approval, rating, and other uses are provided. Information may be stored about one or more graphical documents. Graphical content of a first graphical document being evaluated for distribution may be compared to at least one second graphical document. An approval determination may be made for the first graphical document based on the stored information about the at least one second graphical document and the comparison.

63 Claims, 6 Drawing Sheets

U.S. PATENT DOCUMENTS

| | | |
|---|---|---|
| 6,336,132 B2 | 1/2002 | Appleman et al. |
| 6,421,675 B1 | 7/2002 | Ryan et al. |
| 6,460,034 B1 | 10/2002 | Wical |
| 7,130,885 B2 * | 10/2006 | Chandra et al. ............... 709/206 |
| 2001/0042064 A1 | 11/2001 | Davis et al. |
| 2001/0047297 A1 | 11/2001 | Wen |
| 2001/0051911 A1 | 12/2001 | Marks et al. |
| 2002/0002509 A1 | 1/2002 | Wagom et al. |
| 2002/0002525 A1 | 1/2002 | Arai et al. |
| 2002/0026359 A1 | 2/2002 | Long et al. |
| 2002/0035536 A1 | 3/2002 | Gellman |
| 2002/0038282 A1 | 3/2002 | Montgomery |
| 2002/0046099 A1 | 4/2002 | Frengut et al. |
| 2002/0046104 A1 | 4/2002 | Kaddeche et al. |
| 2002/0077891 A1 | 6/2002 | Castle et al. |
| 2002/0099605 A1 | 7/2002 | Weitzman et al. |
| 2002/0111898 A1 | 8/2002 | Numaoka et al. |
| 2002/0123988 A1 | 9/2002 | Dean et al. |
| 2002/0165773 A1 | 11/2002 | Natsuno et al. |
| 2002/0184097 A1 | 12/2002 | Hijiri et al. |
| 2002/0194062 A1 | 12/2002 | Linde |
| 2002/0198780 A1 | 12/2002 | Kawakami et al. |
| 2003/0037334 A1 | 2/2003 | Khoo et al. |
| 2003/0070167 A1 | 4/2003 | Holtz et al. |
| 2003/0083937 A1 | 5/2003 | Hasegawa et al. |
| 2003/0149618 A1 | 8/2003 | Sender et al. |
| 2003/0163372 A1 | 8/2003 | Kolsy |
| 2003/0216963 A1 | 11/2003 | Ishiwaka et al. |
| 2004/0015397 A1 | 1/2004 | Barry et al. |
| 2004/0019523 A1 | 1/2004 | Barry et al. |
| 2004/0044571 A1 | 3/2004 | Bronnimann et al. |
| 2004/0054577 A1 | 3/2004 | Inouse et al. |
| 2004/0054589 A1 | 3/2004 | Nicholas et al. |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0093620 A1 | 5/2004 | Lino et al. |
| 2004/0119740 A1 | 6/2004 | Chang et al. |
| 2004/0143499 A1 | 7/2004 | Dietsch et al. |
| 2004/0143843 A1 | 7/2004 | Khoo et al. |
| 2004/0167928 A1 | 8/2004 | Anderson et al. |
| 2004/0193915 A1 | 9/2004 | Smith et al. |
| 2004/0249709 A1 | 12/2004 | Donovan et al. |
| 2005/0065806 A1 | 3/2005 | Harik |
| 2005/0071224 A1 | 3/2005 | Fikes et al. |
| 2005/0096979 A1 | 5/2005 | Koningstein |
| 2005/0131758 A1 | 6/2005 | Desikan et al. |
| 2005/0131762 A1 | 6/2005 | Bharat et al. |
| 2005/0144069 A1 | 6/2005 | Wiseman et al. |
| 2005/0210009 A1 | 9/2005 | Tran |
| 2005/0216335 A1 | 9/2005 | Fikes et al. |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0223002 A1 | 10/2005 | Agarwal et al. |
| 2005/0225560 A1 | 10/2005 | Omura |
| 2005/0240858 A1 | 10/2005 | Croft et al. |

FOREIGN PATENT DOCUMENTS

| | | |
|---|---|---|
| WO | WO00/38074 | 6/2000 |
| WO | WO2004/042525 | 5/2004 |

OTHER PUBLICATIONS

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

Google Introduces New Pricing for Popular Self-Service Online Advertising Program, hhtp://www.google.com/press/pressrel/select.html, p. 1-2, dated Feb. 20, 2002, printed on Jul. 29, 2003.

Chris Sherman, "Google Launches AdWords Select," Feb. 20, 2002, 6 pages.

* cited by examiner

METHOD AND SYSTEM FOR APPROVING DOCUMENTS BASED ON IMAGE SIMILARITY

CROSS-REFERENCE

This application is a continuation application of co-pending U.S. patent application Ser. No. 12/644,868, filed Dec. 22, 2009, which is a continuation of U.S. patent application Ser. No. 10/841,833, filed May 10, 2004 (now U.S. Pat. No. 7,639,898), the disclosure of each of which is incorporated herein by reference in its entirety.

FIELD OF THE INVENTION

The present inventions relate generally to rating and approving a graphical document such as an image advertisement.

BACKGROUND OF THE INVENTION

With the advent of the Internet, a seemingly limitless variety of content may be provided to people of varying ages, preferences, and sensibilities. Some content may be more appropriate for some individuals and groups than for others. For instance, violent or pornographic content is typically deemed inappropriate for children. Providing audience-appropriate content is desirable because it generally maximizes benefits and minimizes burdens for both the content provider and the audience. For instance, an audience-appropriate and relevant ad is more likely to generate a sale than an offensive and irrelevant one.

Accordingly, ads and other content are often targeted to specific audiences that may have an interest in the content. For instance, ads directed to males may be displayed during nationally televised football events because they draw large numbers of male viewers. Similarly, an ad for an airline may be displayed at an Internet search engine site when a user submits a query including the word "plane."

However, providing ads and other documents based on user-related content does not ensure the propriety of that content for a particular audience. For instance, a beer advertisement may not be appropriate on a website for recovering alcoholics, even though the ad and the content of the website are related by subject matter.

One method of matching appropriate content to an audience is to manually review the content before distributing it to the audience. However, there are problems associated with manual review. For example, one significant drawback of manual rating systems and methods is the time and expense involved in reviewing the content.

These and other drawbacks exist with current systems and methods.

SUMMARY OF THE INVENTION

Accordingly, various embodiments of the present inventions may be directed to a system and method for approving a graphical document. Information may be stored about one or more graphical documents. Graphical content of a first graphical document being evaluated for distribution may be compared to at least one second graphical document. An approval determination may be made for the first graphical document based on the stored information about the at least one second graphical document and the comparison.

In another exemplary embodiment, a method for approving a graphical document is provided. A first graphical document is processed for distribution. The first graphical document is compared to at least one second graphical document associated with one or more ideas. Based on the act of comparing, the first graphical document is approved for distribution and associated with the one or more ideas. A request is received for a graphical document associated with a concept. The first graphical document is selected from among a plurality of graphical documents based on an association between the one or more ideas and the concept. Based on the selecting action, the first graphical document is distributed, e.g., to an end user and/or a provider.

In another exemplary embodiment, a computer-readable medium encoded with computer program code to approve a graphical document is provided. The program code is effective to perform the following: process a first graphical document for distribution; compare the first graphical document to at least one second graphical document; and approve the first graphical document for distribution based on the comparison.

In another exemplary embodiment, a method of rating a graphical document is provided. A first graphical document is processed for distribution. The first graphical document is compared to at least one second graphical document. The first graphical document is flagged for review based on the comparison.

In another exemplary embodiment, a method for approving a graphical document is provided. A first graphical document is processed for distribution. The first graphical document is compared to at least one second graphical document associated with one or more ideas. Based on the comparison, the first graphical document is approved for distribution, and the first graphical document is associated with the one or more ideas. A request for a graphical document associated with a concept is received. The first graphical document is selected from among a plurality of graphical documents based on an association between the one or more ideas and the concept. Based on the selecting action, the first graphical document is delivered to at least one of an end user and a provider.

In another exemplary embodiment, a system for approving a graphical document is provided. Storage means store information about one or more graphical documents. Comparison means compare graphical content of a first graphical document being evaluated for distribution with the at least one second graphical document. Determination means make an approval determination based on the stored information about the at least one second graphical document and the comparison.

DETAILED DESCRIPTION OF EXEMPLARY EMBODIMENT(S)

The embodiments described herein solve many problems with existing systems and methods. One problem facing Internet content providers is evaluating a large number of documents (such as advertisements presented through its services) to determine whether each is appropriate for a wide variety of different users. Embodiments described herein overcome these and other problems by processing a document to determine its appropriateness by identifying similar documents and comparing the document to the similar documents (e.g., other similar appropriate or inappropriate documents). The processing may occur automatically, i.e., by a machine-implemented process and/or without human input or intervention.

Yet another problem is that content providers may, in some circumstances, be held to a higher duty (e.g., legal duty) of appropriate content distribution when the content provider is aware of offensive content. In an exemplary embodiment, the content provider relies on rating(s) by others and thus may not incur a higher duty. Rather, the server at least partially delegates the review of its content to a processor that compares the document to other similar documents. Because the content provider takes active steps to ensure that content is appropriate for end users, the content provider may be deemed to have satisfied general duties of care in preventing the improper distribution of offensive content.

An embodiment of the present invention provides for uploading a document such as a graphical advertisement and comparing the document to other documents. The document can be compared to other documents by a document processor (e.g., automatically by an image processor). The processor may process images, sound files, and other data to identify text and images (as well as spoken words and other data) in the image ad. For instance, text may be identified in an image using optical character recognition (OCR) technology. By comparing the document to other documents, content can be identified in and associated with the document, and the document can be accordingly rated and approved based on this content and the status of the ratings of the comparison documents. The document can also be associated with content-based concepts (e.g., keywords, subject matter, etc.) that relate to a service or product associated with the documents.

While the term "advertisement" and "ad" may be used as an illustrative example, it should be appreciated that the same system and method may be applied to other forms of documents or electronic documents. As used herein, the term "document" and "electronic document" may encompass one or more advertisements, content pages (e.g., web pages), search results, emails, applications, IM messages, audio content or files, video content or files, other files, other data or applications that may reside on one or several (e.g., a network) of computer systems, or other definable concepts or content.

Overview and System Architecture

Figure 1:
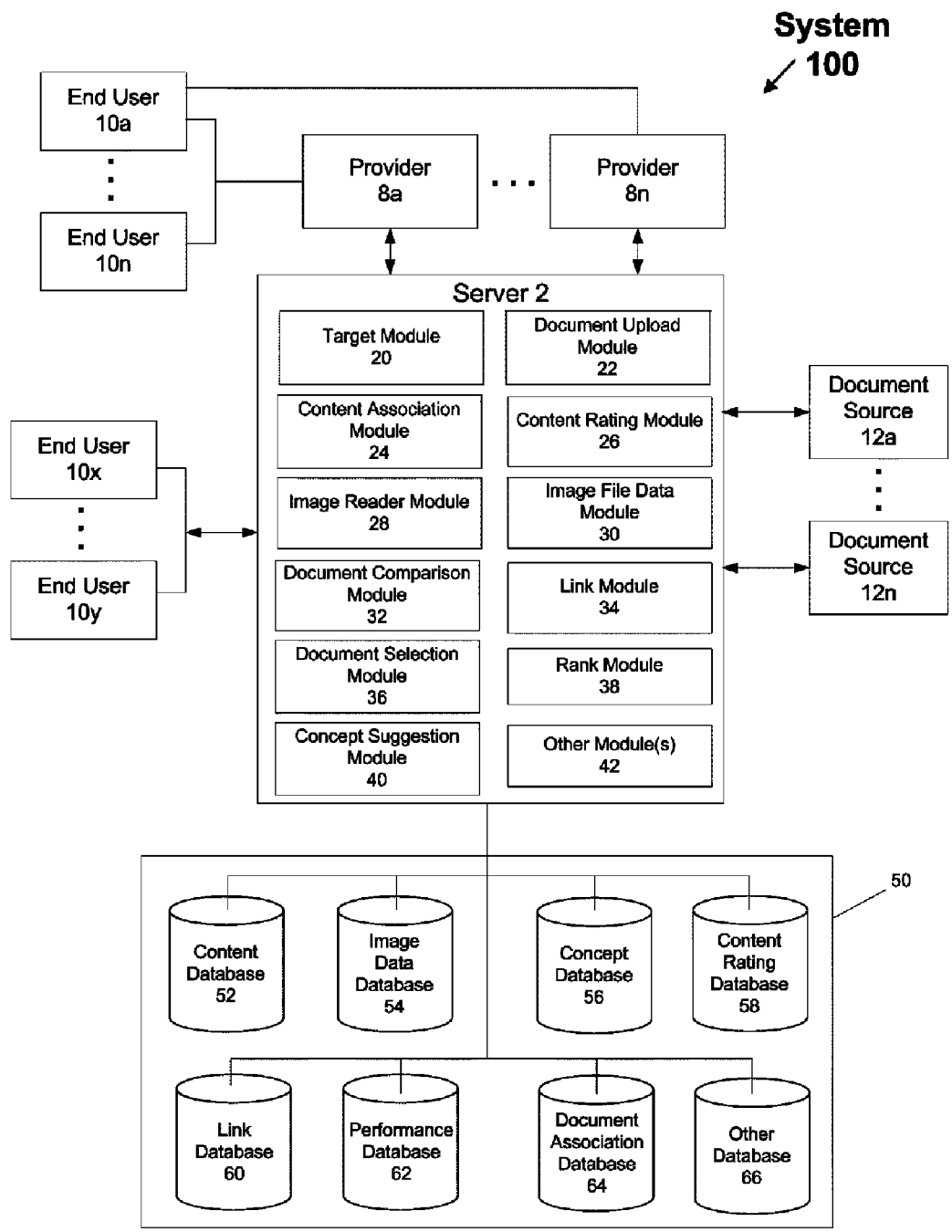
FIG. 1 depicts a system for targeting an electronic document according to an embodiment of the invention.

FIG. 1 depicts a system 100 for providing an electronic document in a targeted manner based on the content of the electronic document and an indicated interest of the request responsive to which the electronic document (e.g., an advertisement) may be delivered targeting an electronic document according to an embodiment of the invention. The system may comprise: a server 2, one or more providers 8, one or more document sources 12, one or more end users 10, and one or more databases 50 operatively connected to server 2.

System 100 may enable server 2 to process content ratings of electronic documents. Document sources 12, providers 8, and end users 10 may communicate with one or more server 2 via electronic communication, including Internet communications. Document sources 12, providers 8, and end users 10 may include or have access to one or more servers 2 for providing functionality associated with electronic documents.

Information that may be communicated between and among server 2, providers 8, document sources 12, and end users 10 may include one or more of the following: document information, document performance information, content rating information, sensitivity rating information, suitability standard information, trust score information, evaluator or provider information, link information, linked document information, document similarity information, associated concept information, concept price information, and other information. The document information may include one or more of the following: the document itself, any language(s) used in the document, length information, information regarding the type(s) of files in the document (e.g., html, doc, zip, etc.), type of document (advertisement, educational document), summary information, audio-visual content (e.g., pictures of faces, song lyrics, etc.), pornographic content, other offensiveness content (e.g., use of potentially offensive words), age-related content, the identity of the document owner and/or the document creator, information about the document's intended audience (such as geographic area, age range, gender, race, national origin, religion, other demographic information), and any other information related to a document or to the server 2, providers 8, or document sources 12.

In particular, providers 8, document sources 12, end users 10, and server 2 (collectively and individually, "rating entities") may generate document rating information for one or more documents. This information may be provided to and used by the server 2. For instance, the rating entities may receive a document, such as an image ad, from the server 2 (or provider 8) and then provide rating information about the document (and/or other documents referenced or linked to in the document) to the server 2.

Document sources 12 may provide documents to server 2, or server 2 may "pull" or retrieve documents from document sources 12. For instance, the document source 12 may provide an advertisement to server 2 so that the server 2 may then provide the advertisement to one or more content providers 8, and the providers 8 may provide the ad to one or more end users 10 (or server 2 may provide the ad directly to the end user 10). Document sources 12 may include any content creator or content provider 8, such as an advertisement listings provider or server 2.

Providers 8 may provide documents to one or more end-users, 10a through 10n. Providers 8 may include a content provider, search engine or other entity that makes available information, services, and/or products over an electronic network, such as the Internet. A provider 8 may include one or more of the following, for example: an advertisement listings provider, an electronic document provider, a website host, a server 2, any other entity that provides electronic documents to users or other entities, or any other provider of content. A provider 8 may be an evaluator or a document provider 12.

An evaluator may be a provider 8, a document source 12, an end user 10, an image reader module 28, an image file data module 30, a document comparison module 32, a link module 34, an other module 42, and server 2. An evaluator may be one or more persons, groups, and/or processors. The providers 8 may be partners of an entity associated with operating server 2. An end user 10 may be one or more persons, computers, computer networks, or other entity on a network. An end user 10 may request and receive content from a provider 8 and/or server 2. Additional participants may be included based on various applications.

The server 2 may comprise any server 2, hub, central processor, provider, search engine, or other entity in a network. A database 50 coupled to the server 2 may include one or more databases 50-64. Also, databases 50-64 may comprise portions of a single database 50. It should be appreciated that the databases 50-64 may or may not be physically distinct. The server 2 and its modules 20-42 may store and access information stored in the database(s) 50-64.

A content database 52 may store documents and/or data related to the documents, such as portions, images, and text of documents. The content database 52 may also store patterns, rules, and programming usable by the image file data module 30 to identify patterns and images in image documents such as graphical advertisements.

The documents may be received from document sources 12 and/or providers 8. The server 2 may also generate documents. The documents may be rated and/or unrated. For example, the documents may or may not have rating information of a specific type associated with them. For instance, the documents may have rating information from modules 28, 30, but not from an end user 10 or provider 12.

The content database 52 may identify documents of a certain type and/or group or otherwise associate documents together. For instance, documents may be identified and/or associated with other documents according to one or more of the following features: subject matter, content rating, aggregate content rating, sensitivity score, content type, language, geographic origin (e.g., country or city of origin), geographic area of target audience, document source 12, owner of content, creator of content, target demographic, or other criteria. For instance, the documents may be identified or grouped according to their offensiveness/appropriateness content, associated keywords, associated site (e.g., a site explicitly or implicitly linked from the document, such as through an embedded hypertext link), status of associated site (e.g., whether a link in a document is broken and/or points to an invalid URL), flesh content (e.g., state of undress of human images), pornographic or other prurient content, adult content, drug- or alcohol-related content, children's content. The documents may also target age, gender, race, national origin, religion, or other criteria. Other factors related to matching content to an appropriate audience can be considered.

An image data database 54 may store image data. The image data may be received from a document source 12, the image reader module 28, and the image file data module 30. For instance, the image reader module 28 may read image data and store it in the image data database 54.

The image data database 54 may also store a wide variety of images and data used by Optical Character Recognition ("OCR") (e.g., OCR processors and/or software) and other image processors to process and identify text and images. For instance, the image data database 54 may store programs and files that define and describe various images and image types. The programs may also identify patterns in the document that can be used to compare the document to other documents (e.g., by comparing the patterns in one document to the patterns in another). The image data database 54 may store generic (and specific) images for comparison. For instance, the image data database 54 may store a generic image of an apple. The document comparison module 32 may process an image of a fruit and compare it to the stored image of the apple to determine whether the two images are sufficiently similar and accordingly determine whether the image can be classified as an image of an apple.

A concept database 56 may store concepts associated with documents. For instance, one or more concepts may be associated with a document by content association module 24, image reader module 28, and image file data module 30. The associated concepts may be stored in this database 56. Document selection module 36 may access concept database 56 to distribute to end users and providers. For instance, in order to select a document associated with a specific concept, the document selection module 36 may access the concept database to match the specific concept with one or more concepts in the database. In this way, a document can be selected that is related to the specific concept.

A content rating database 58 may store content ratings (i.e., "rating information") and other information generated by the image data module 28, as well as any other information that may be relevant to rating a document. For instance, the content rating database 58 may store information relating to number of clicks on a document, number of times a document has been provided, click through rate, number of times a document has led to a transaction (e.g., when a user clicks on a document and then purchases from a linked or otherwise associated site), feedback (e.g., feedback received from end users 10 or providers 12), information relating to complaint letters filed for a document, verification information (such as a content creator vouching for the appropriateness of a particular document), and third party or other determinations relevant to the content of a document. Each stored content rating may be associated with a particular evaluator and a particular document (e.g., an electronic document).

Each content rating may comprise one or more subject ratings. For instance, a content rating may include a rating for violent content and separate ratings for sexual content and drug-related content. If a document links to one or more other documents (e.g., links to a URL), content ratings of the linked document may also be included here. These separate ratings may or may not be combined into a single score (e.g., a single aggregate rating for a document). A document's content rating and/or aggregate rating may change as new rating information for the document is received.

The content rating database 58 may also store a general approval status of a document and performance data related to a document. The approval status may be "approved," "disapproved," "suspended pending further review," or "un-approved," for instance. A document may have an approval status for a variety of criteria. The performance data may comprise a document's click through rate, feedback rating, number of feedback ratings, transaction rate (number of times the document has led to a transaction compared with how many times the document has been provided by the server 2 or selected by an end-user), and transaction volume, among other criteria.

A link database 60 may store linked documents and the links themselves. For instance, the server may receive an image ad from a document source 12a. The image ad may have an embedded hypertext link (e.g., http://www.website.com/about/index) as well as a different link displayed in the image (e.g., www.website.com). The link database 60 may store the two links; link database 60 may also store the linked documents, e.g., an image or html file of the websites located at the linked addresses. The link database 60 may also store other link-related information.

A performance database 62 may store document performance information, such as click through rate (CTR), cost per click (CPC), revenue information, and other information. The performance database 62 may store data associated with cost per click (or other price parameter), including bid amounts, for each graphic and/or advertiser. It may also store data associated with a CTR or other performance parameter for each graphic and/or advertiser.

A document association database 64 may store document association information, such as similarity ratings between documents, groupings of similar or related documents (e.g., advertisements for the same product or from the same document source 12). The information may be received from the document comparison module 32. The database 64 may also store concept association information and performance-related information, such as the CTR of documents that are similar or related to each other as well as the concepts (e.g., keywords) associated with them. For instance, the database 64 may identify several image ads that have substantially identical content but different keywords and different CTRs. The concept suggestion module 40 may access the document association database 64 to determine suggested concepts for a document.

Other database(s) 66 may store other information related to the documents, links, linked documents, document evaluators, and other information.

The server 2 may comprise one or more modules to process documents and content, document ratings and other entity ratings, trust scores (e.g., of document sources), and other data. The modules of server 2 may store, access and otherwise interact with various sources of data, including external data, databases and other inputs.

Target module 20 enables a document source 12 such as an advertiser to specify a target (intended) audience. For example, an advertiser may specify a preferred language, country or other demographic preference. The advertiser may want to reach potential customers through a content page, search results page and/or other type of page. The advertiser may also specify if the graphic will be displayed on syndicated sites. In addition, the advertiser may not specify any target audience or any limitation.

Figure 5:
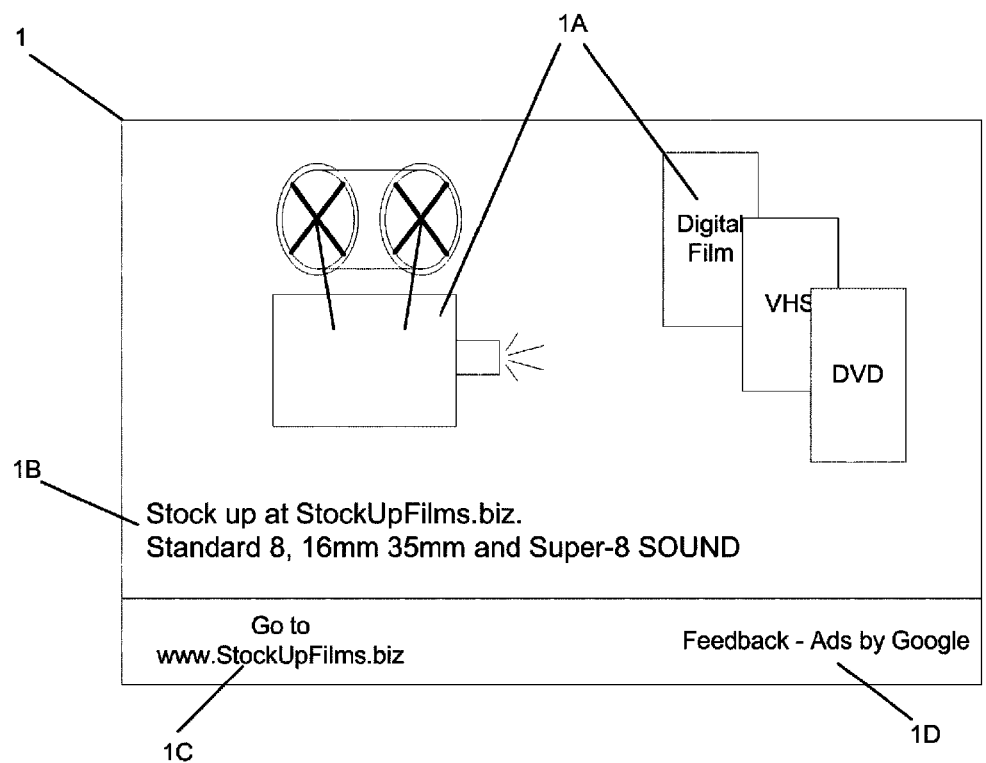
FIG. 5 depicts an exemplary image according to an embodiment of the invention.

Document upload module 22 enables a document source 12 such as an advertiser to upload a graphic (e.g., the image ad shown in FIG. 5). The graphic may be uploaded by identifying an address (e.g., URL address, etc.). The graphic may be downloaded from the advertiser's website or other associated site. The graphic may be retrieved from a database or other source. The graphic may include various visual options, including animation, pop-up ability, sound waves, etc. and may also include text, such as a text advertisement. The server may size or shape the graphic to fit a predetermined size or shape. In addition, the advertiser may select from a selection of sizes and/or shapes for display. For example, the advertiser may be willing to pay more for a larger size graphic rather than settle for a smaller standard size. By enlarging the graphics, an advertiser may increase potential click through by end-users.

A content association module 24 may associate keywords, subject matter, ideas, and other content with a document or portion thereof. The content association module 24 may associate keywords and other ideas with a document based on information received from the image reader module 28, image file data module 30, document comparison module 32, link module 34, concept suggestion module 40, and from document sources 12 or end users 10 (e.g., via feedback).

For instance, the content association module 24 may receive information describing the text and images of an image ad from the image file data module 30 after the image is processed by the image reader module 28. Based on the descriptions of the text and images, the content association module may associate keywords with the document. In the case of the image and text of the image ad of FIG. 5, the content association module may associate the ad with the keywords "8 mm film," "16 mm film," and "35 mm film," and "film equipment." The content association module 24 may store the content associations in the concept database 56. When a document associated with a concept is subsequently requested, a document may be selected (e.g., by the document selection module 36) that has keywords related to the concept. For instance, if a document associated with "4 mm film" is requested, the document of FIG. 5 may be provided because "4 mm film" is closely related to the identified keywords associated with FIG. 5. For instance, the concept "4 mm film" and the keywords of FIG. 5 may be closely related in semantic space.

In some embodiments, the content association module 24 may receive preference information from document sources 12. For instance, one document source 12a, such as an advertisement listings provider, may request that a particular image ad provided by the source 12a (e.g., the ad shown in FIG. 5) be associated with the phrase "digital film". The content association module 24 may accordingly associate the image ad with the phrase "digital film," or any other requested keyword or subject matter of interest.

In some embodiments, the content association module 24 may associate documents with concepts and/or subject matters of interest based on information received from the concept suggestion module 40. For instance, the concept suggestion module 40 may indicate that the ad shown in FIG. 5 should be associated with the word "film."

The content rating module 26 may create content rating requests for documents and pass them to evaluators. For instance, content rating module 26 may request that an evaluator manually review a document flagged for offensive content by the document selection module 36. The content rating request may comprise a list of information requested for a document to be rated. The content rating request may be the same or different for each document. Accordingly, the information requested may be different (or the same) for each document, such as for documents of a specific type (such as image ads or documents related to a specific type of keyword or industry). For instance, a request to rate a beer advertisement may request detailed information about the way beer/alcohol is portrayed, while a request to rate a power tool merchant's website might not. The content rating module 26 may also receive and process content ratings received from evaluators. The content rating requests and content ratings may be communicated via traditional mail, email, or other methods. For instance, the server 2 may send to an evaluator a link to a server 2 website that contains the document and associated content rating information. The evaluator may then access the document and provide the content rating directly on server 2. The content rating module 26 may then electronically process the rating information.

A document such as an image ad may be disapproved or marked for review if it links to a "broken" document. For instance, an end user 10 may report via feedback that a link in a document does not effectively direct the end user's 10 browser to the intended site (or to any site at all), or otherwise causes an error, such as a failure to properly load the linked document.

Any document may be selected for review, such as documents with no ratings, documents with only automated ratings (e.g., ratings from the image reader module 28 and the image file data module 30), documents with few ratings, documents with ratings indicating questionable or inappropriate content (or documents related to questionable content), documents with broken or inappropriate links or linked documents, documents with performance criteria of a specific type (e.g., a low or high click-through rate), or other documents. For instance, a web page from an alcohol distributor may be selected for review while an advertisement from a utensil manufacturer due to its higher likelihood of containing content inappropriate for children.

The content rating module 26 may also process rating information related to the performance of the document, such as the document's click through rate. This process is explained in further detail in U.S. patent application Ser. No. 10/742,791 entitled "Method and System for Providing Targeted Graphical Advertisements," filed Dec. 23, 2003, and in U.S. patent application Ser. No. 10/812,417 entitled "System and Method for Rating Electronic Documents," filed Mar. 30, 2004. These applications are incorporated herein by reference in their entirety.

Image reader module 28 may comprise one or more computers or data processors equipped with one or more optical sensors. The optical sensors of the image reader module 28 may be equipped to identify and/or read optical data from the image of the document (e.g., from a picture or photocopy of an image ad), and it may do so automatically. The image reader module 28 and image file data module 30 may also process a computer file storing the document or image (e.g., a .pdf or .tif file) rather than optically reading a physical embodiment of the document. In some embodiments, an optical sensor may first "read" a physical embodiment of the document and convert optical image data into a file (e.g., a .pdf file, .tif file, or other image file format). In other words, the image reader module 28 may "read" and process the image information of a document in a manner analogous to how a human's eyes and brain read and process text and images from a page of a newspaper.

The optical sensor may use a laser, scanner, or other optical input device to read and capture image data from a physical embodiment of the document (e.g., a paper copy of a text document, or a photograph of an image). Scanners that convert images into electronic files (e.g., .pdf or .tiff files) are well-known in the art. The image reader module 28 may then process the file. For instance, the optical processor may use OCR to recognize or identify patterns in the stored optical data. Some types of OCR involve the translation of optically scanned bitmaps of printed or written text characters into character codes, such as ASCII.

By processing optical data from the image of the document, various optical scanning technologies may enable the optical processor to identify characters and images from the document. For instance, OCR technology (e.g., OCR scanners and software) may enable an image reader module 28 to identify text characters in a document. OCR may enable an image reader module 28 to distill the text of a newspaper by optically "reading" the newspaper. For instance, the image reader module 28 may identify the following text in the document shown in FIG. 5: "Stock up at Stockupfilms.biz/Standard 8, 16 mm 35 mm and Super-8 SOUND/Go to www.StockUpFilms.biz/Feedback—Ads by Google." The distilled text may be stored in a file. The text may be used to associate concepts with the document in the content association module 24.

An image file data module 30 may process image data, such as data received from the image reader module 28. The image file data module 30 and image reader module may have overlapping functions. Generally speaking, the functions of the image reader module 28 may be similar to that of the unintelligent human eye in that it captures and converts optical data, and the image file data module 30 may act like a human brain by intelligently processing the data. I.e., the image reader module 28 may convert an image into a .pdf or ASCII file, and the image file data module 30 may identify letters, numbers, and specific images in the file.

The image file data module 30 may use OCR to identify any links in the document, e.g., links visibly shown in text and having an associated embedded hypertext link. For instance, the module 30 may identify text in the image that states "for more information go to www.moreinformation.com". The image file data module 30 may recognize that the format of the letters "www." followed by a string of letters and numbers and concluding with the letters ".com", ".biz," ".org," ".gov," ".edu," ".us," ".de," or another country suffix is a link. The module 30 may then pass any identified links to a link module 34.

Links may be similarly identified by the module 30 from other data associated with the document. For instance, an embedded hypertext link may be identified from an ".html" document or other computer code that is not explicitly visible in the image of a document.

Although traditional OCR technology is typically used to identify text, OCR and technologies similar to OCR may enable the image file data module 30 to identify one or more images in a document based on the optical and/or computer file data processed by the image reader module 28. In other words, instead of identifying merely text and other "characters", the module 30 may recognize and identify images. For instance, the module 30 may read an image and determine that the image contains a picture of a film projector, a bottle of beer, a person (in varying states of dress), or another object.

The image file data module 30 may accordingly identify specific images (e.g., a famous person's face, a ham sandwich, a soft drink, a pizza, a location such as a schoolyard, etc.) by identifying patterns in an image or other document, such as geometric patterns. For instance, the image reader module 28 may recognize a closed book cover by identifying a three-dimensional rectangular image with text shown on the front and side covers at a particular orientation similar to the orientation on a real book cover. Geometric and other patterned rules for recognizing content may be stored in the image data database 54.

The image file data module 30 may also determine other optical data relating to the image, such as image colors, color schemes, patterns, and other information. By using such technology, the module 30 may determine an amount of human flesh (e.g., unclothed human flesh) appearing in an image. Accordingly, an image reader module 28 may determine the amount or presence of text or images of drugs, alcohol, nudity, or other potentially offensive or inappropriate content. Based on this information, the image reader module 28 may rate the document (e.g., image) along these and other criteria.

An advantage of using the modules 28, 30 to determine rating information is that rating information can be automatically determined (i.e., without human intervention). Because the server 2 may receive and distribute thousands, millions, and/or billions of different documents, the transaction and administrative costs of manually reviewing each document may be prohibitive and/or expensive. The modules 28, 30 may provide a sufficient preliminary review of an image or other document to determine whether a document is approved (e.g., acceptable and appropriate) for general distribution or for distribution to one or more specific providers 8 or end users 10.

For instance, the modules 28, 30 may identify inappropriate content in an image ad and accordingly flag the image ad for review or otherwise change the rating of the image ad. For instance, the modules 28, 30 may identify that an image has an unacceptably large amount of human flesh, meaning that it may be pornographic or otherwise inappropriate for children. Such an ad may be flagged for further review (e.g., manual review), or it may be deemed inappropriate for certain users (e.g., children) or otherwise not approved for general distribution. Further manual review of the content may later indicate that the flesh was part of an image of a heavyweight boxer, and the ad may be approved.

The modules 28, 30 may also identify inappropriate text (e.g., the word "sex") in an ad, link, or linked document. The modules 28, 30 may accordingly process a variety of information related to a document in order to determine its content and appropriateness.

Collectively, the modules 28, 30 may handle the automatic rating of documents such as image ads or other documents containing images. When the server 2 receives a new or modified document (or request to modify a document) from a document source 12, the modules 28, 30 may cause the document to be processed and rated as described above. In this way, a rating can be automatically obtained for each document as it is received by the server 2 (or generated by the server 2).

It should be understood that a single document may have one or more electronic embodiments and one or more physical embodiments. For instance, a single document may take the forms of a .pdf file, a .gif file, a .tiff file, a file of another format, a printed piece of paper, a photograph, another physical object, or a visual display on a screen or monitor. Thus, a single document may be passed from the server 2 to the rating entities (such as the image reader module 28 and image file data module 30) in an electronic format (e.g., .pdf format) or a physical embodiment (e.g., a printed document on a piece of paper).

It should be further understood that the image reader module 28 and image file data module 30 may also be configured to process and identify concepts based on sounds, animations, video, pop-up ability, and other audio-visual information. Accordingly, the modules 28, 30 may further comprise speakers, microphones, and audio/video processors. For instance, the modules 28, 30 may comprise voice recognition technology to process sound files to determine words spoken or sung in a sound file. The modules 28, 30 may further be configured to recognize types of sounds, like the sound of the ocean, the sound of jazz music, and the sound of an orchestra. Based on audio (and other audio-visual) information, additional concepts may be associated with a document.

A document comparison module 32 may compare the image (or portions thereof) to other images (or portions thereof), e.g., images or portions stored in the content database 52 and image data database 54. Specifically, the document comparison module 32 may compare an image from one document source 12a to one or more documents from the same document source 12a already stored in the content database 52 or image data database 54. For instance, the document comparison module 32 may determine whether a document is identical to (or substantially identical to) another document. The document comparison module 32 may also determine a degree of similarity between two or more documents (e.g., that a document is 80% similar to another document).

The document comparison module 32 may compare two or more documents by comparing processed data associated with the images. For instance, the module 32 may process image data files received from the image modules 28, 30. The document comparison module 32 may compare the images, text, formatting, and patterns of one document to that of another. For instance, the module may identify that two different documents contain the same (or similar) image of an apple and the same (or similar) text describing an orchard.

The document comparison module 32 may determine a similarity rating between two or more documents and associate similar documents with each other. The module 32 may also determine that two documents, images, text, or other features of a document are substantially identical to those features of another document. A "substantially identical" document (or image, pop-up, etc.) may be a document that is determined to have content that is 90% identical (or 95%, 98%, or 99.5%, etc.) to another document. For instance, 90% of the text may be identical (90% of the words are identical, in an identical order), and/or the patterns defining the images of one document may be 99% identical to the patterns defining the images in another document. Other measures of "substantially identical" may be considered.

Accordingly, the document comparison module 32 may identify concepts (e.g., text, images, sounds, etc.) in one document by identifying the concepts of a substantially similar or identical document. For example, one or more human evaluators may associate a first document with several concepts, such as an apple, an orchard, and a peach. Also, the advertisement listings provider may bid on the keywords "red apple" for the first document. This information may be stored in the content database 52, the concept database 56, and the document association database 54. The document comparison module 32 may identify that a second document is substantially identical to this document, e.g., because the second document has nearly identical text and images (regardless of whether the document comparison module can identify the actual content of the images). Because the two documents are similar and the first document is associated with "red apple," "orchard," and "peach," the second document may be associated with the same concepts.

It should be understood that a document can be associated with concepts other than words. For instance, a document can be associated with images, sounds, and patterns. For instance, a vacation advertisement can be associated with sound files of seagulls and waves crashing on a seashore, and pornographic advertisements can be associated with patterns that indicate a high presence of human flesh (and nudity).

Although one document may be determined to have nearly identical text and images but different formatting, the document comparison module 32 may determine the (relative) equivalence of the two documents. For (substantially) identical documents, the image reader module 28 may indicate that the document is (substantially) identical to another document and identify the other document. If a first document is identified to be substantially identical to a second document already stored in the database, it may receive the same rating information as the first document. For instance, if the second document is approved, then the first document may be approved (e.g., automatically in response to identifying that the second document is approved). If the second document is flagged for review, un-approved, or in another state, then the first document may receive a similar status. Further, if a document contains an image (such as an apple) that is nearly identical to a stored image (another apple), the document comparison module 32 may determine that the document contains an image of an apple. The content association module 24 may accordingly associate the document with the keyword "apple," and/or the concept suggestion module 40 may accordingly suggest that the document be associated with the concept "apple."

It should be appreciated that two documents may be similar or substantially identical, or at least the content of the two documents may be similar or substantially identical, even if the documents have different sizes, shapes, formats, colors, or other physical features.

The document comparison module 32 may also identify that a first document has similar offensive or inappropriate content as a second document or image. For instance, if the module 32 identifies that an image ad contains an image that is substantially identical to an inappropriate image of Janet Jackson in a web page that was determined to be pornographic, the module 32 may flag the image ad for review or otherwise indicate that the image ad may have inappropriate content. For instance, the module 32 may send negative rating information to the content rating module 26, and the content rating module 26 may flag the ad or otherwise change the ad's rating.

The link module 34 may inspect one or more links in a document (e.g., automatically in response to identifying the link). For instance, if an image ad document comprises one or more links (e.g., if the image ad displays a URL link on the ad, embeds a hypertext link, or otherwise enables a viewer to select an associated document, e.g., by clicking on a link), the modules 28, 30 may access the link and the linked document. If the modules 28, 30 are unable to access the link or linked document (e.g., if the processor's web browser fails to load the linked document or there is another error), the processor may report a "broken" link (e.g., automatically in response to identifying a "broken" link). For instance, the modules 28, 30 may report this information as rating information to the content rating module 26.

The link information may comprise the link quality rating (e.g., whether the link works or has any problem) as well as the content (e.g., content ratings) of the link and any linked documents (e.g., linked websites). The information may be obtained in any manner of rating documents as described herein. Any link-associated information may be stored in the link database 60 or the content database 52. The link-associated information may also be passed to the content association module, e.g., so that keywords and other concepts may be associated with a document as a result of the links associated with the document.

Finally, link-related information may be passed to the content rating module 26, e.g., so that the content of any linked documents (or the link itself) may be factored into a document's rating. For instance, an image ad selling children's toys may receive an inappropriate rating if it links to www.sex.com (e.g., regardless of the content of the sex.com site), or if it links to a site relating to drugs or alcohol.

The link module 34 may periodically inspect links in documents, e.g., even after a document has already been rated. For instance, it may check links every month, or every tenth time a user clicks on the link, to ensure that the document has a working link that directs users to an appropriate site.

A document selection module 36 may select and provide documents in response to a request from a provider 8, end user 10, or other entity. For instance, a children's book retailer may request an advertisement to display on their site. In response, the document selection module 36 may identify or determine sensitivity score information and suitability information associated with the children's book retailer and then selects a document based on this information (such as an identified suitability standard). For instance, if the site is associated with a high sensitivity to violent content, the document selection module 36 may select content that has an aggregate rating indicating zero violent content. The document selection module 36 might also select a document that was verified by a trusted evaluator to have no objectionable violent content.

Document selection may be based on the aggregate rating (or a content rating) associated with the document, as well as suitability and/or sensitivity information. For instance, the document selection module 36 may determine that the provider 8 (or end user 10) has a high sensitivity against prurient content and therefore select a document where no evaluator found pornographic content—or where no evaluator found sexual content of any kind. The document selection module 36 may also determine that the provider prefers documents with an aggregate rating that indicates a high value in the category of child content and therefore select a document containing substantial children's content.

By identifying a suitability and/or sensitivity score for particular providers 8 and end users 10 (or other entities that receive documents), a document may be chosen that fits a suitability profile (or standard) associated with that entity. Thus, end users may receive non-offensive content, and content providers may ensure the propriety of the content provided on their sites.

In some embodiments, the document selection module 36 may select and provide "approved" documents. An approved document may be any document that has a sufficiently high or otherwise acceptable aggregate rating or sufficiently high content rating in any of a variety of content areas. For instance, in some embodiments an approved document may be any document with a rating indicating general approval for all audiences. In some embodiments, an approved document may be any document with no negative ratings (or no ratings). For instance, for image ads with a means for providing rating information such as feedback (see FIG. 4), an approved document may comprise documents with no feedback.

The document selection module 36 may select documents based on the recipient of the documents. For instance, if the recipient is a male, the document selection module 34 may select a document that is associated with male audiences.

The document selection module 36 may identify recipient information, e.g., by inspecting "cookies" on an end-user's computer. For instance, the document selection module 36 may identify preferences of an end user 10 based on prior information received from the end user, such as rating information for a prior provided document. Information enabled or identified by the document selection module may be stored in the evaluator database 60.

Figure 6:
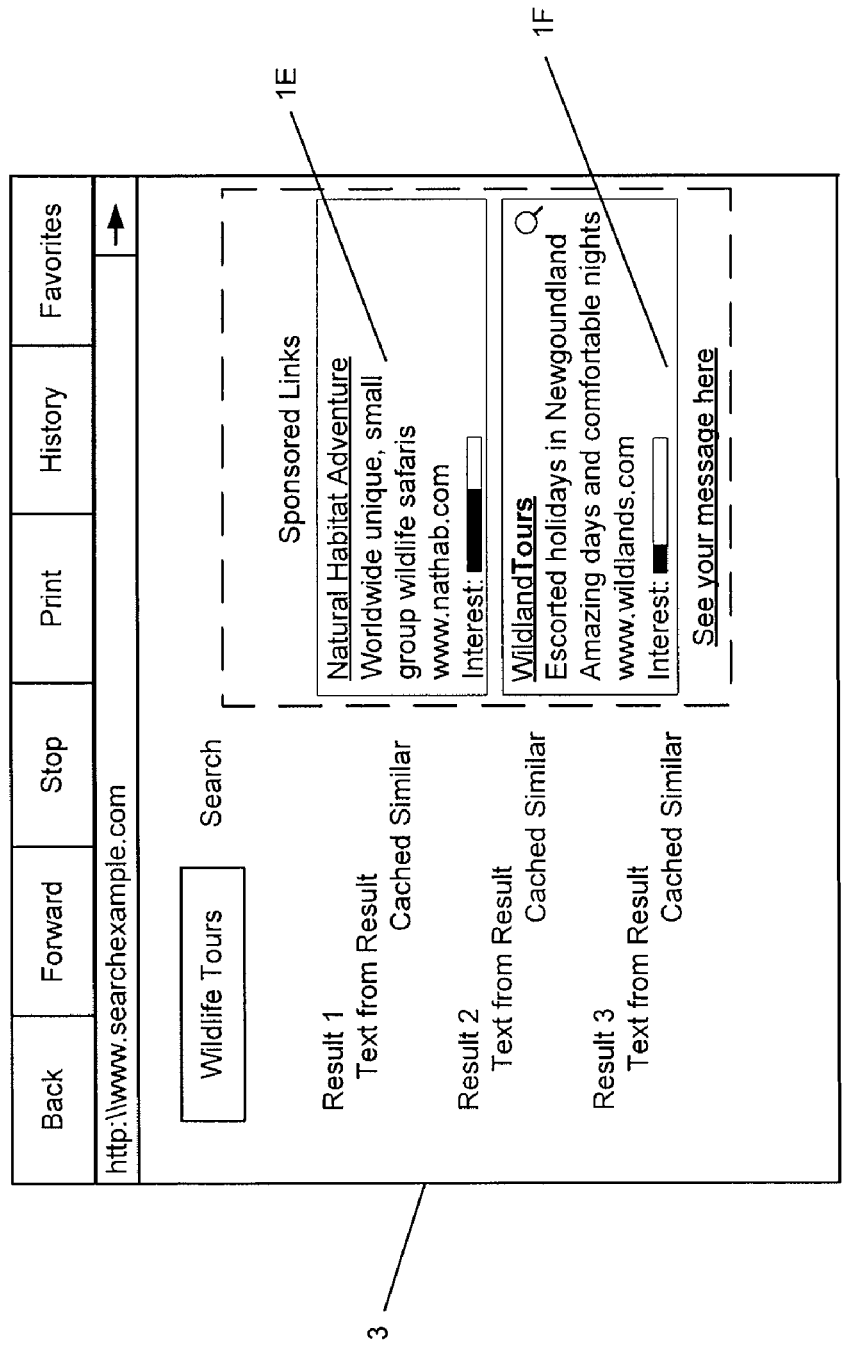
FIG. 6 depicts an exemplary document showing an ordered ranking according to an embodiment of the invention.

A rank module 38 may determine a rank of the ad, graphic, or other document. The rank of the document may refer to the placement of the document. For instance, a higher ranked document may be displayed in a position higher (e.g., closer to the top of a web page) than another document. In FIG. 6, advertisement 1E may be considered to be displayed in a higher rank than advertisement 1F. The rank of a specific document may be based on performance and pricing information of the document, the document source, the relevance of the document to a requested concept, and other criteria.

Generally, the higher (or more prominently) the document is displayed, the more likely an end-user will be to take notice, thereby improving the potential for a click through (e.g., an end-user clicking on the document). According to one example, the ranking of the document may be determined by multiplying the cost per click (CPC) and the click through rate (CTR). Other methodologies for ranking documents may be implemented. For example, other price parameters and/or performance parameters may be considered.

Based on differences in customer behavior, the performance parameter for content pages and search pages may be different. Other adjustments may be applied for different types of pages.

An auction process for determining which advertisement to show in which placement may become more complicated as the pricing for graphical advertisements may have a premium associated with the display. For example, placement of advertisements may be based on a click through rate and cost per click (e.g., bid amount or any amount offered by an advertiser) combination (e.g., CTR*CPC). For a graphical advertisement, the cost per click amounts may be different for different types of documents and also in relation to text advertisements. In another example, the CTR value for graphical advertisements may be adjusted by an amount or a variation of the CTR. A different ranking function, such as CTR'*CPC may be implemented, where CTR' may represent an adjusted CTR for graphical advertisements (or types of graphical advertisements). In another example, a ranking function may involve CTR*CPC/z where z may represent a function of the graphical advertisement type. Other variations and adjustments may be implemented. Graphical advertisement type may include a variety of considerations, such as size, animation, color, sound, voice, visual options (e.g., pop-up ability, etc.), type of product or service, images used, or other characteristic associated with the document.

During the process of ranking the documents, there may be instances where the document may be ranked with other documents as well as other text advertisements. In ranking documents with text advertisements, an adjustment may be applied. For example, a graphical advertisement may occupy more space than a text advertisement. In addition, a document may be considered more likely to be clicked on. Thus, an adjustment may be applied when compared to text advertisements. In another example, advertisers may be charged a higher rate for graphical advertisements based on a higher likelihood that the advertisement will be selected. Further, additional costs may be associated for additional enhancements (e.g., animation, sound, music, size, shape, etc.) or other features that may increase the advertisement's likelihood of being selected. In yet another example, to encourage the use of graphical advertisements, a provider may offer an incentive (e.g., credit, compensation, etc.) to an advertiser for displaying graphical advertisements. Additional incentives may be provided for additional enhancements to the graphical advertisements.

In addition, rank module 38 may also determine a position for the graphical advertisement or other document. Some advertisements may be displayed as a banner, across the top of a page (e.g., search page, content page, etc.), along the side of search results, and anywhere else on the page.

A concept suggestion module 40 may suggest concepts to associate with a document. For instance, the concept suggestion module 40 may identify concepts or subject matters of interest that may be associated with a particular document, and the module 40 may pass these suggestions to a document source 12 and/or content association module 24. The document source 12 (e.g., the document source that provided the document to the server in the first place) may then select one or more concepts and/or subject matters of interest based on the suggested concepts.

To determine suggested concepts to associate with a particular document such as an image ad, the concept suggestion module 40 may process document information from the concept database 56, link database 60, performance database 62, document association database 64, and any other database 40. For instance, the concept suggestion module 40 may suggest one or more keywords or subject matters of interest to associate with a specific document based on any of the following factors: (1) the text, images, links, and other content identified in the specific document; (2) the keywords and/or subject matters of interest selected for and/or associated with similar documents; (3) the performance of the similar documents (e.g., based on keyword and document similarity); (4) the performance of the specific document (e.g., the document's CTR using a particular keyword); (5) the performance of related or similar documents using a specific keyword (such as the CTR for a similar document using a specific keyword); (6) the cost of a particular concept of keyword; (7) and any other factors.

For instance, for a specific image ad, the concept suggestion module 40 may examine performance data of an image ad similar to the specific image ad, e.g., as identified by the document comparison module 32. The concept suggestion module 40 may identify various concepts associated with one or more similar ads (e.g., the keywords or subject matters of interest selected by the document sources 12 for those ads) and evaluate the performance of those documents based on concept (e.g., the CTR of a document associated with a specific keyword or other concept). For instance, the document comparison module 32 may identify that the image ad shown in FIG. 5 is similar to several other image ads. The concept suggestion module 40 may identify that the advertisement listings providers 12 who provided those ads selected the keywords "film," "movies," and "digital video disc," respectively. The concept suggestion module 40 may accordingly suggest that the document be associated with these keywords.

The module 40 may further determine that several of the most similar documents (e.g., documents that were determined to be greater than 90% similar to the document in FIG. 5) are associated with the words "film" and "movies" while less similar documents (less than 70% similar) were associated with the term "digital video disc." The module 40 may also determine that the similar documents associated with the word "film" had a higher click through rate than the documents associated with the word "movies." Accordingly, the concept suggestion module 40 may suggest that the document be associated with the word "film."

The concept suggestion module 40 may rate a variety of suggested concepts. For instance, the module 40 may suggest that the document of FIG. 5 be associated with the word "film" and "8 mm," but the module 40 may also indicate that selecting the word "film" is most likely to lead to the highest CTR.

Other module(s) 42 may accomplish other functions related to targeting and/or rating electronic documents. Several additional server 2 and system 100 functions are described in U.S. patent application Ser. No. 10/742,791 entitled "Method and System for Providing Targeted Graphical Advertisements," filed Dec. 23, 2003, the U.S. patent application Ser. No. 10/812,417 entitled "System and Method for Rating Electronic Documents," filed Mar. 30, 2004, and in the U.S. patent application Ser. No. 10/814,834 entitled "System and Method for Rating Documents Comprising an Image". These applications are incorporated herein by reference in their entirety.

These applications describe other modules 42 that enable processing rating information for documents. For instance, documents may be received and/or generated and passed to evaluators, such as end users, providers, and other entities. The documents may have a feedback link or another mechanism for rating a document, e.g., so that end users can rate a document after receiving the document. The server 2 may receive the ratings and determine content ratings (e.g., sexual content, violent content, and other appropriateness or suitability factors) for each rated document. The content ratings may be aggregated and stored in the content rating database 58. Aggregate ratings may indicate ratings in a variety of content areas, such as adult content and violent content. Each evaluator and document source 12 may receive a trust score that may rate the trustworthiness of each particular evaluator, e.g., so that an untrustworthy evaluator's ratings do not overly influence a document's aggregate ratings. Sensitivity information may be determined for various providers and end users who have specific preferences for the type of content they receive (e.g., a prohibition on pornography).

Illustrative System Network Environment

Figure 2:
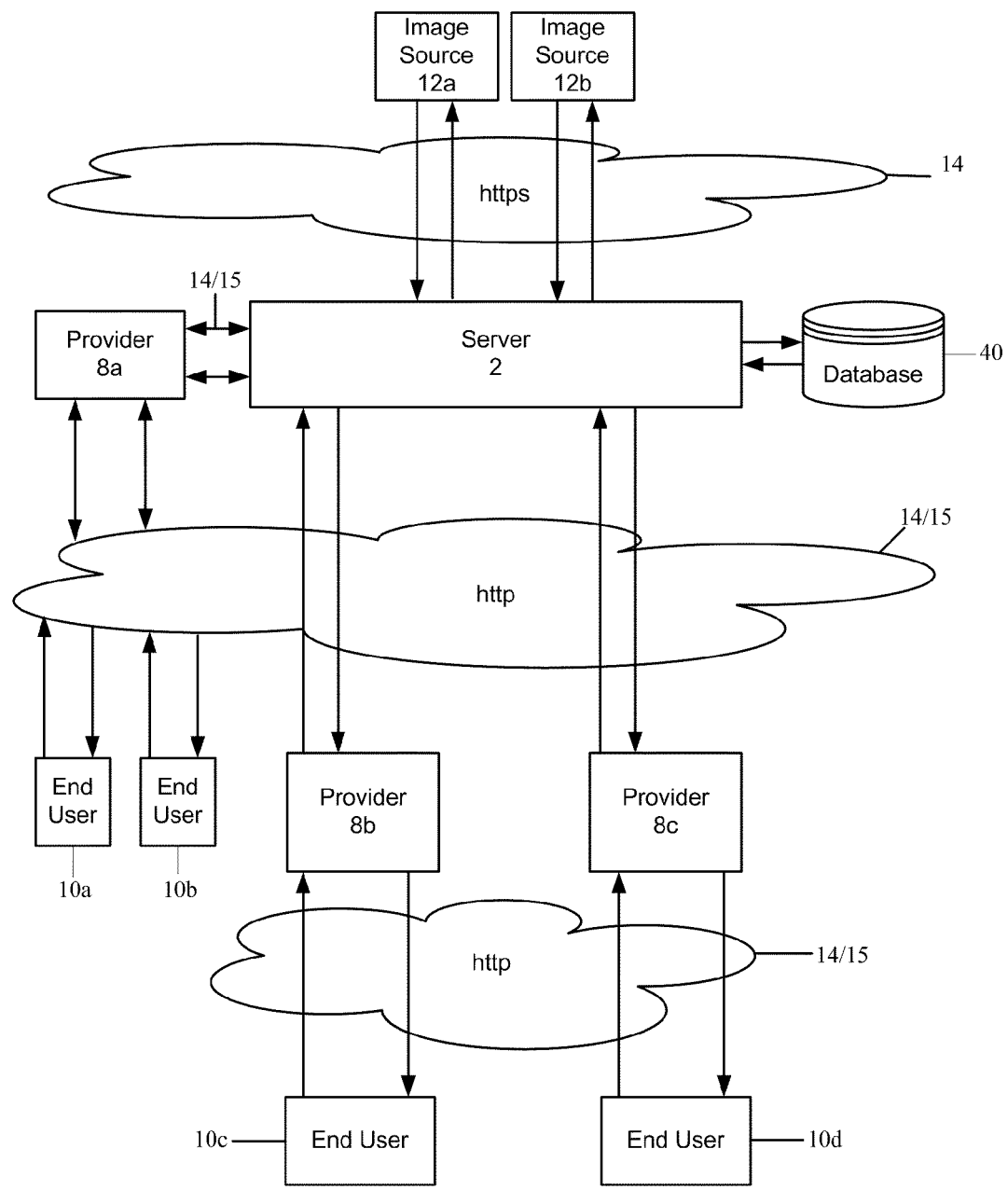
FIG. 2 depicts a networked environment for operation of a system for targeting an electronic document according to an embodiment of the invention.

FIG. 2 depicts a networked environment for operation of a system for targeting an electronic document according to an embodiment of the invention. In such an environment, evaluators and providers 8 may connect over a network 14, 15 to a server 2 (e.g., using a secure https connection) to provide documents and rating information to server 2 and to receive documents and rating request information from server 2. The server 2 may store the document, rating, and performance information in a database 50. The server 2 may distribute the documents through various forums or feeds, including direct distribution in print media, providing the documents on one or more web sites affiliated with the server 2 and through providers 8. It should be noted that providers may comprise syndication partners of the server 2 (e.g., connected over network 14 or 15 depending on security desired), content systems (e.g., with associated content databases) and search engine systems operated by the server 2 or provider(s) 8.

Through these various forums, the documents provided to the providers 8 may be included in pages (or other documents) displayed to end-users 10 (often called an impression).

Each of server 2, evaluators, providers 8, and document sources 12 may comprise computerized systems that include one or more of the following systems: a web server 2, a database server 2, proxy server 2, network balancing mechanisms and systems, and various software components that enable the system to operate on the internet or other network type system. Additionally, networks 14 and 15, although depicted as http networks, may comprise other networks such as private lines, intranets, or any other network. In an exemplary embodiment, the connection between a document source 12 such as an advertisement provider and server 2 (and other connections such as between a provider 8 and server 2) may comprise secure network connections to insure that data is not subject to attack or corruption by any hacker or other third party. In addition, whereas two evaluators and two document providers 12 are depicted, it should be appreciated that one or more evaluators and one or more document providers 12 may be provided in the network. Similarly, although one database 50 is depicted, it should be appreciated that multiple databases 39 may be provided and that such databases 39 may be connected to the server 2 via any type of network connection, including a distributed database server 2 architecture.

Similarly, provider 8*a* may comprise any number of such systems connected to the evaluator or server 2 via any type of network, including an http or https network. Content provider 8 may comprise a system such as server 2 that provides functionality for enabling connection over the Internet or other network protocols. End users 10 may comprise any user (such as users connected to the internet) and may comprise computerized systems that enable that connection through any of various types of networks, including through Internet service providers, cable companies, and any other method of accessing data on the Internet. Providers 8 may comprise any system that distributes content such as advertising to end-users 10.

Illustrative Process

Figure 3:
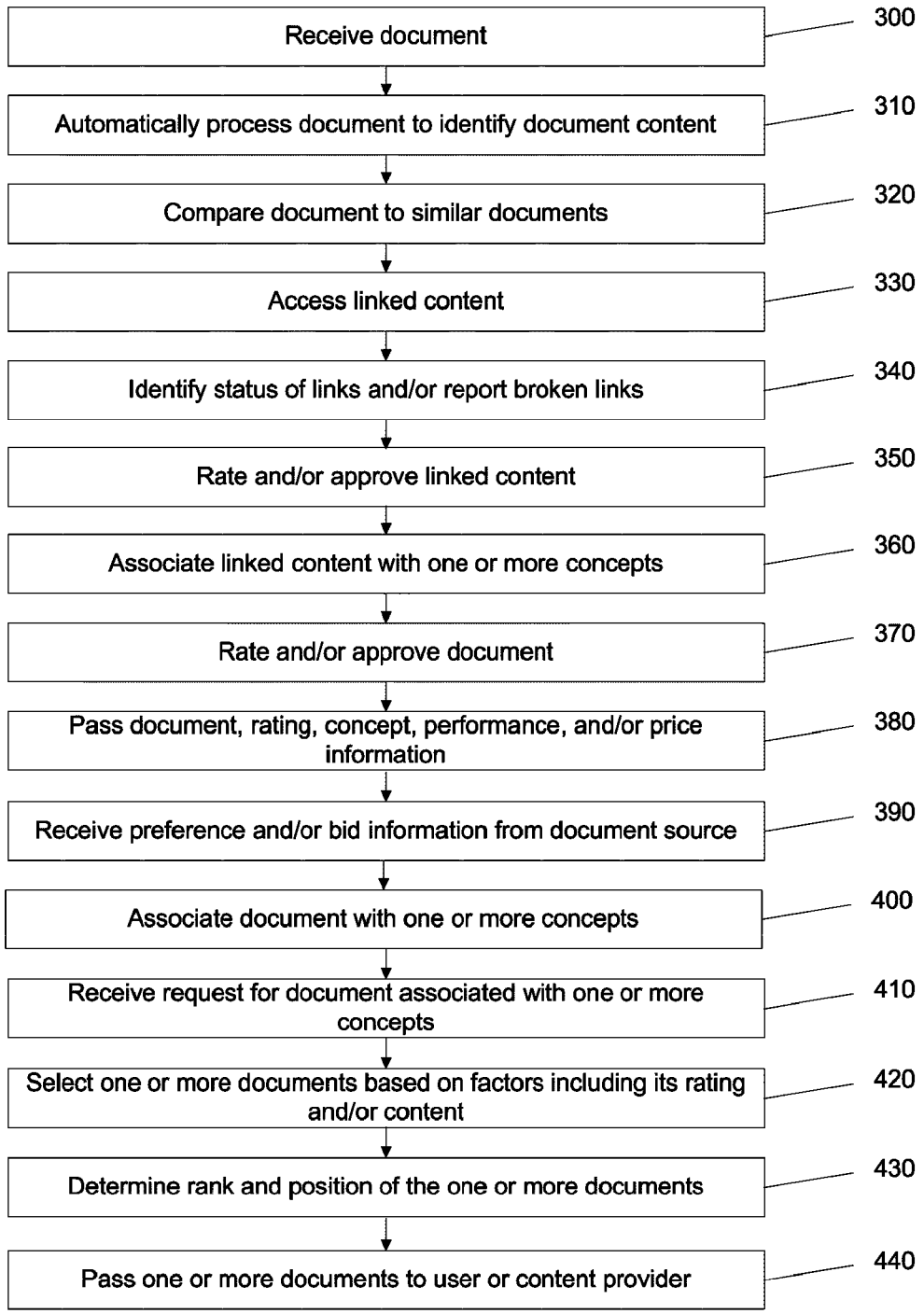
FIG. 3 is a flow chart illustrating an exemplary method for delivering an electronic document to a targeted audience based on the graphical content of the electronic document according to an embodiment of the invention.

FIG. 3 is a flow chart illustrating an exemplary method for targeting an electronic document according to an embodiment of the invention.

In block 300, a document may be received. For instance, a document source 12*a* such as an advertisement listings provider may pass an image advertisement to the server for distribution to providers 8 and end users 10. By way of example, the document may be an image ad showing Britney Spears drinking a yellow soft drink on stage. The document source 12*a* may also provide information associated with the ad, such as performance and pricing information. For instance, the source 12*a* may bid on one or more keywords such as "Britney" and "Spears" and "Britney Spears concert."

A document may also or alternatively be generated by the server 2 (e.g., automatically in response to a request for a document). For instance, the server 2 may receive a request to create an ad associated with an advertising entity (e.g., a document provider), and the server 2 may generate an ad based on information associated with the advertising entity (e.g., the advertiser's logo, product, and website). The server 2 may create a document of a predetermined size and format. The server 2 may then distribute the advertisement as described herein, e.g., in response to a request for a document.

In block 310, the document may be processed to identify document content (e.g., automatically). For instance, the image reader module 28 and image file data module 30 may process the document as described herein to identify text and/or images in the document. An image of Britney Spears may be identified, as well as text indicating an endorsement of a beverage product (e.g., "I use BeverageCo's lemon-lime soft drink after all my shows") and a link to the BeverageCo website (e.g., www.beverageco.com), which may be displayed in the ad and/or embedded in the hypertext of the ad.

In block 320, the document may be compared to similar documents. For instance, based on the image processing in block 310, the document comparison module 32 may compare the processed image information to image information of other documents and identify similar documents. Concepts such as keywords associated with the similar documents may be identified.

In block 330, linked content may be accessed, e.g., by the link module 34. This block 350 is relevant only for documents that comprise at least one link. For instance, the link module 34 may access the www.beverageco.com website linked in the Britney Spears ad via a browser.

In block 340, the status of any links may be identified and/or reported. For instance, the link module 34 may identify that the BeverageCo link was functional and that the linked BeverageCo website properly loaded in a browser. If the link did not properly direct the browser to the proper website, or if the website failed to load, the link may be reported broken.

In block 350, linked content may be rated and/or approved. As in block 310, the content of the link and any linked documents may be rated and/or approved, e.g., by modules 28, 30. The rating/approval information may be associated with the underlying document.

If a link associated with a document is broken, the document may be flagged for review or otherwise disapproved. Similarly, if a link is determined to be associated with inappropriate content (e.g., there is inappropriate content at a linked website), the document may be flagged for review.

In block 360, the linked content may be associated with one or more concepts. The linked content may be associated with concepts such as keywords. The ratings and associations of the underlying document may reflect the ratings and associations of the linked content, as described above.

In block 370, the document may be rated and/or approved. For instance, the image modules 28, 30 may identify a large amount of flesh content in the image of Britney Spears and accordingly rate the document as unsuitable for young children. The ad may be approved for other audiences. Also or alternately, the ad may be approved for all audiences, or disapproved for all audiences. The ratings may be based on a variety of criteria, such as feedback (e.g., from users), performance ratings (e.g., click through rate), aggregate rating, trust scores, links and linked documents, and other criteria. In some embodiments, the rating/approval information may be determined automatically, e.g., by modules 28, 30.

If a document is flagged or otherwise not approved based on its content (e.g., if the ad contains inappropriate content such as sexual words or violent images), the document may be passed to one or more evaluators for human review. The document may be later approved after a number of human reviewers approve the image's content, or if the image receives little or no negative feedback.

In block 380, document, rating, concept, performance, and/or price information is passed, e.g., to the document source 12*a*. For instance, one or more suggested concepts are passed to the advertisement listings provider 12*a*.

In block 390, preference and/or bid information is received from the document source 12*a*. For instance, an advertisement listings provider 12*a* may review the information received in block 380 and amend the document and/or select (or bid on) one or more concepts or keywords for the ad.

In block 400, the document may be associated with one or more concepts. For instance, the document may be associated with one or more keywords, ideas, and/or subject matters of interest identified by the content association module 24, concept suggestion module 40, and document source 12*a*. For instance, an image ad may be associated with a concept based on a selection by the advertisement listings provider 12*a*.

In the example above, in conjunction with the content association module 24, the modules 28, 30 may identify concepts associated with ad, such as: Britney Spears, BeverageCo, lemon-lime, and music. The concept suggestion module 40 may also identify that a similar ad with a high CTR is associated with the words "Britney Spears." These words and phrases may be associated as keywords and/or subject matters of interest for the ad. The concept association(s) may be stored in a database 50, such as the concept database 56.

In block 410, a request for a document associated with one or more concepts may be received. For instance, an end user may submit a search query on a search engine website or request a website or other document. The search query may comprise the words "Britney lemon drink." The request may accordingly be associated with concepts such as "Britney lemon drink" or concepts associated with a user's currently viewed website. For instance, a user on a website relating to pirate treasure maps may be associated with "pirates" and/or "treasure maps."

Concepts may be associated with some requests (e.g., automatically). For instance, the database 50 may also store information about specific users and/or providers, and requests from those specific users and providers may be associated with the information. For instance, the database may store information indicating that the user is a professional musician. The server may accordingly interpret the musician's request for a website or other document as a request associated with music, music instruments, or other music-related concepts.

The server may accordingly interpret the search query and the pirate site surfing as requests for a webpage (and/or ad) associated with the user-related content.

In block 420, one or more documents may be selected based on factors including the document's rating and/or content (and the rating/content of any links or linked documents), e.g., by the document selection module 36. In some embodiments, a document is selected that is related to the concepts identified in block 410. For instance, the search query "Britney lemon drink" may cause the server to select the Britney Spears ad. Here, the document selection module 36 may compare the keywords of the ad (e.g., Britney Spears, lemon-lime, music, BeverageCo) with the concepts associated with the request (e.g., Britney lemon drink). The module 36 may determine that some of these words match or are otherwise closely related in semantic space. Based on such determination, the module 36 may select the ad.

Other factors may be considered in selection, such as price criteria, performance criteria and appropriateness as detailed in U.S. patent application no. entitled "Method and System for Providing Targeted Graphical Advertisements," filed Dec. 23, 2003, and in U.S. patent application Ser. No. 10/812,417 entitled "System and Method for Rating Electronic Documents," filed Mar. 30, 2004. For instance, the module 36 may select a document other than the Britney ad if the Britney ad is determined to be inappropriate (or have an insufficient aggregate content rating), or if the ad has a low click through rate.

In block 430, a rank and position may be determined for the one or more documents. In many embodiments, a rank is determined only when more than one document is selected in block 420. For instance, the documents may be provided in an ordered list (from the top down), and some documents may have specific other positions (e.g., a banner at the top of a web page). The rank and position may be determined based on price and performance information. For instance, a document with a high bid on a keyword may have a higher rank (and/or have a more prominent position) than a document with a lower bid on the same keyword when the documents are provided in response to the keyword.

In block 440, the document may be passed to a user or content provider. In many embodiments, the document is passed to the entity that requested the document. For instance, it may be passed to the user who submitted a search query.

If the document contains a feedback mechanism, such as that shown for the document in FIG. 5, the user may provide feedback by selecting (e.g., clicking on) the feedback icon. The feedback may change the document's rating and/or performance criteria.

It will be appreciated to those skilled in the art that the acts described may be performed by hardware, software, or a combination thereof, with or without human intervention, as may be embodied in one or more computing systems such as a server 2 system coupled to entities such as providers, evaluators, databases, and end users. Further, it should be appreciated that not all of the blocks must be accomplished. For instance, in one embodiment, the method may begin at block 310 and end at block 370. Also, it is not necessary that the action(s) of each block be performed in the order shown in FIG. 3. Any order of performance may be considered.

Illustrative User Interface and Results

Figure 4:
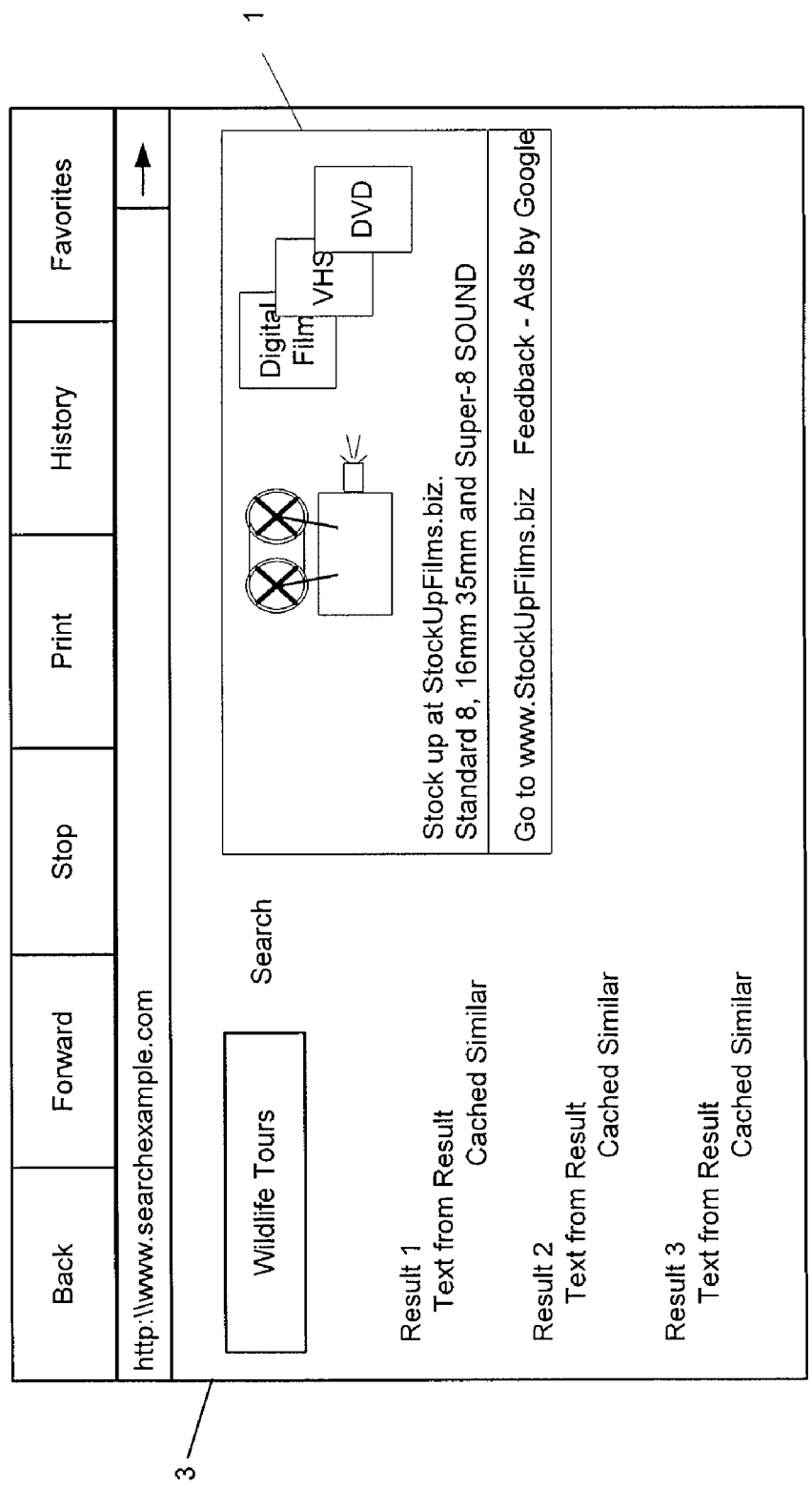
FIG. 4 depicts an exemplary document according to an embodiment of the invention.

FIG. 4 shows an exemplary document 1 according to an embodiment of the invention. FIG. 4 depicts an exemplary web page 3 search result from an Internet search engine. The web page 3 itself may be a document. Content on the web page 1 may also be a document. For instance, advertisement 1 on the search result page 3 may also be a document. Other types of documents may be considered, such as advertisements, files, programs, and other information.

The document may have various types of content. For instance, the document may have words, images, sounds, and other information, as well as functions or programs, which may dynamically produce words, images, sounds, and other information. Each document may have different amounts of various types of content, such as sexual content, violent content, drug or alcohol-related content, financial content, adult-related content, child-related content, and other content.

FIG. 5 depicts an exemplary image advertisement document 1 according to an embodiment of the invention. The image ad 1 may comprise a banner ad, another ad that can be displayed on a web page, or another graphical advertisement that can be displayed via an electronic means. The image ad 1 shows specific images 1A, ad text 1B, one or more links 1C, and a mechanism 1D for rating the document 1. The specific images 1A comprise a film projector and images of a DVD, VHS, and digital film container. The text 1B comprises an advertisement message, e.g., a description of a product or service, a suggestion to a potential customer, and/or other advertising text. The link 1C may comprise a link to another document, such as the advertiser's web page URL (or portion thereof). For instance, the link 1C may comprise an embedded hypertext link, and the embedded link may be associated with the link 1C displayed in the image of the document 1. In some embodiments, selecting (e.g., clicking on) the displayed URL or other link while viewing the document 1 (e.g., in a web browser) may direct the viewer's mechanism for viewing documents (e.g., web browser) to the content associated with the link (e.g., the advertiser's web page).

The document 1 may explicitly display the link 1C. Alternately, the link 1C may be embedded in the document (e.g., in the programming of the document) or a portion thereof such that the link 1C is not visible. Here, selecting (e.g., clicking on) the document 1, an image 1A, text 1B, or another portion of the document may direct a user's document viewing mechanism to the linked document(s). The document 1 itself, images 1A, and text 1C may also comprise one or more links 1C. For instance, an ad that advertises a plurality of products may comprise a link for each product, wherein selecting (e.g., clicking on) an image 1A, icon 1A, or text 1B relating to a specific product may direct a web browser (or other document viewing mechanism) to a page at a merchant's site associated with the specific product (or to another document).

The mechanism 1D may comprise a link for providing rating information. For instance, selection of the mechanism 1D (e.g., clicking on the link 1D) may direct the document viewer to an email or web page where the user may provide rating information. For instance, the web page may comprise prompts for providing rating information or otherwise request rating information. Other mechanisms 1D for providing a communication link between an evaluator and server 2 may be contemplated herein.

FIG. 6 depicts an exemplary document showing an ordered ranking according to an embodiment of the invention. Like FIG. 4, FIG. 6 shows an exemplary document 1 according to an embodiment of the invention, namely an exemplary web page 3 search result from an Internet search engine. The web page 3 itself may be a document. Content on the web page 1 may also be a document. For instance, advertisement 1 on the search result page 3 may also be a document.

FIG. 6 shows two advertisements 1E, 1F in an ordered ranking on the page 1. Advertisements 1E, 1F may be text or image ads or other documents. Here, advertisement 1E is listed above advertisement 1F. For instance, ad 1E may have a higher rank than ad 1F as determined by rank module 38. There may be any number of documents 1E, 1F, each displayed in an order (i.e., ranking) on the web page 3.

It should be understood that the server, processors, and modules described herein may perform their functions (e.g., comparing a document to another document or determining rating information) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to image ads, the principles herein are equally applicable to other documents, such as websites. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A system comprising:
    a data processing apparatus with one or more processors; and
    a computer-readable memory in data communication with the data processing apparatus and storing instructions executable by the one or more processors and upon such execution cause the data processing apparatus to perform operations comprising:
        receiving a first graphical document;
        comparing graphical content of the first graphical document to graphical content of a second graphical document;
        flagging the first graphical document based on the comparison;
        providing the flagged first graphical document to one or more evaluator terminals for rating information; and
        approving or disapproving the flagged first graphical document based on the rating information received from the one or more evaluator terminals.

2. The system of claim 1, wherein the instructions cause the data processing apparatus to flag the first graphical document if the second graphical document contains material identified as objectionable and the graphical content of the first graphical document is substantially identical to the graphical content of the second graphical document.

3. The system of claim 1, wherein the instructions cause the data processing apparatus to flag the first graphical document if the comparison indicates that the first graphical document contains material identified as objectionable.

4. The system of claim 1, wherein the instructions cause the data processing apparatus to disapprove the first graphical document if the rating information contains a predetermined number of negative ratings from the one or more evaluator terminals.

5. The system of claim 1, wherein the first graphical document contains graphical content having one or more links; and
    where the instructions cause the data processing apparatus to determine an operating status of the one or more links and disapprove the first graphical document if the operating status indicates at least one broken link.

6. The system of claim 1, wherein the instructions cause the data processing apparatus to flag the first graphical document if the first graphical document contains less than a minimum number of ratings, is rated with a rating indicative of content identified as objectionable or one or more broken links, or is associated with a particular class of advertising model.

7. The system of claim 1, wherein the computer-readable memory further includes instructions executable by the one or more processors and upon such execution cause the data processing apparatus to perform operations comprising:
associating the first graphical document with one or more keywords or concepts; and
delivering the first graphical document, after approval, to a requestor requesting a document associated with the one or more keywords or concepts.

8. A system comprising:
a data processing apparatus with one or more processors; and
a computer-readable memory in data communication with the data processing apparatus and storing instructions executable by the one or more processors and upon such execution cause the data processing apparatus to perform operations comprising:
storing one or more graphical documents;
storing content rating information associated with the one or more stored graphical documents;
comparing graphical content of a graphical document under evaluation with graphical content of the one or more stored graphical documents to identify a matching graphical document; and
granting a distribution approval to the graphical document under evaluation based on the match and content rating information associated with the matching graphical document.

9. The system of claim 8, wherein:
the content rating information indicates a presence of content identified as acceptable or objectionable; and
the instructions cause the data processing apparatus to deny distribution of the graphical document under evaluation if the content rating information associated with the matching graphical document indicates the presence of content identified as objectionable.

10. The system of claim 9, wherein the instructions cause the data processing apparatus to grant the distribution approval to the graphical document under evaluation if the content rating information associated with the matching graphical document indicates the presence of content identified as acceptable.

11. The system of claim 10, wherein the computer-readable memory further includes instructions executable by the one or more processors and upon such execution cause the data processing apparatus to perform operations comprising:
receiving one or more negative ratings from one or more users associated with the graphical document under evaluation;
presenting the graphical document under evaluation to an evaluator terminal; and
receiving rating information associated with the graphical document under evaluation from the evaluator terminal.

12. The system of claim 11, wherein the instructions cause the data processing apparatus to grant the distribution approval based on at least one of the content rating information associated with the matching graphical document and the rating information received from the evaluator terminal indicative of an absence of content identified as objectionable.

13. The system of claim 8, wherein:
at least one of the stored graphical documents includes an approved advertisement image; and
the instructions cause the data processing apparatus to perform operations comprising:
identify the approved advertisement image as the matching graphical document if the graphical content of the graphical document under evaluation is substantially identical to graphical content of the approved advertisement image; and
grant the distribution approval the first graphical document based on content rating information associated with the approved advertisement image.

14. The system of claim 8, wherein the computer-readable memory further includes instructions executable by the one or more processors and upon such execution cause the data processing apparatus to perform operations comprising:
associating the graphical document under evaluation with one or more keywords; and
receiving an advertisement request associated with a concept, and serve the graphical document under evaluation after the distribution approval is granted based on a correlation between the concept and the one or more keywords.

15. The system of claim 14, wherein the advertisement request includes a search query.

16. The system of claim 8, wherein the instructions cause the data processing apparatus to compare one or more image files associated with the graphical document under evaluation with one or more image files associated with the one or more stored graphical documents.

17. The system of claim 8, wherein the graphical document under evaluation is associated with an advertising entity; and
where the instructions cause the data processing apparatus to compare the graphical document under evaluation with one or more graphical documents associated with a same advertising entity.

18. The system of claim 8, wherein the instructions cause the data processing apparatus to compare at least one of an image, animation, and sound of the graphical document under evaluation with at least one corresponding image, animation, and sound of the one or more stored graphical documents.

19. The system of claim 8, wherein the instructions cause the data processing apparatus to compare at least one of the color scheme, objects, text, size, shape, formatting, file type, and source of the graphical document under evaluation with a corresponding color scheme, objects, text, size, shape, formatting, file type, and source of the one or more stored graphical documents.

20. The system of claim 8, wherein the one or more stored graphical documents are formatted in a common file type; and
where the graphical document under evaluation is converted to the common file type prior to comparing.

21. A system comprising:
a data processing apparatus with one or more processors; and
a computer-readable memory in data communication with the data processing apparatus and storing instructions executable by the one or more processors and upon such execution cause the data processing apparatus to perform operations comprising:
comparing graphical content of a first graphical document to graphical content of at least one approved graphical document, the at least one approved graphical document having graphical content approved for display with publisher content;
approving the first graphical document for distribution if the comparison indicates a substantial match between graphical content of the first graphical document and graphical content of the at least one approved graphical document; and delivering the first graphical document to a requestor for publishing upon approving the first graphical document.

22. A computer-implemented method comprising:
storing a first graphical document;
comparing graphical content of the first graphical document to graphical content of a second graphical document by a processor;
flagging the first graphical document based on the comparison;
providing the flagged first graphical document to one or more evaluator terminals for rating information; and
approving or disapproving the flagged first graphical document based on the rating information received from the one or more evaluator terminals by the processor.

23. The method of claim 22, further comprising flagging the first graphical document if the second graphical document contains material identified as objectionable and the graphical content of the first graphical document is substantially identical to the graphical content of the second graphical document.

24. The method of claim 22, further comprising flagging the first graphical document if the comparison indicates that the first graphical document contains material identified as objectionable.

25. The method of claim 22, further comprising disapproving the first graphical document if the rating information contains a predetermined number of negative ratings from the one or more evaluator terminals.

26. The method of claim 22, wherein the first graphical document contains graphical content having one or more links; and
an operating status of the one or more links is determined and the first graphical document is disapproved if the operating status indicates at least one broken link.

27. The method of claim 22, further comprising flagging the first graphical document if the first graphical document contains less than a minimum number of ratings, is rated with a rating indicative of content identified as objectionable or one or more broken links, or is associated with a particular class of advertising model.

28. The method of claim 22, further comprising:
associating the first graphical document with one or more keywords or concepts; and
delivering the first graphical document, after approval, to a requestor requesting a document associated with the one or more keywords or concepts.

29. A computer-implemented method comprising:
storing one or more graphical documents;
storing content rating information associated with the one or more stored graphical documents;
comparing graphical content of a graphical document under evaluation with graphical content of the one or more stored graphical documents to identify a matching graphical document by a processor; and
granting a distribution approval to the graphical document under evaluation based on the match and content rating information associated with the matching graphical document by the processor.

30. The method of claim 29, wherein:
indicating, by the content rating information, a presence of content identified as acceptable or objectionable; and
denying distribution of the graphical document under evaluation if the content rating information associated with the matching graphical document indicates the presence of content identified as objectionable.

31. The method of claim 30, further comprising granting the distribution approval to the graphical document under evaluation if the content rating information associated with the matching graphical document indicates the presence of content identified as acceptable.

32. The method of claim 31, further comprising:
receiving one or more negative ratings from one or more users associated with the graphical document under evaluation;
presenting the graphical document under evaluation to an evaluator terminal; and
receiving rating information associated with the graphical document under evaluation from the evaluator terminal.

33. The method of claim 32, further comprising granting the distribution approval based on at least one of the content rating information associated with the matching graphical document and the rating information received from the evaluator terminal indicative of an absence of content identified as objectionable.

34. The system of claim 29, wherein:
at least one of the stored graphical documents includes an approved advertisement image; and
further comprising:
identifying the approved advertisement image as the matching graphical document if the graphical content of the graphical document under evaluation is substantially identical to graphical content of the approved advertisement image; and
granting the distribution approval the first graphical document based on content rating information associated with the approved advertisement image.

35. The method of claim 29, further comprising:
associating the graphical document under evaluation with one or more keywords; and
receiving an advertisement request associated with a concept, and serve the graphical document under evaluation after the distribution approval is granted based on a correlation between the concept and the one or more keywords.

36. The method of claim 35, wherein the advertisement request includes a search query.

37. The method of claim 29, further comprising comparing one or more image files associated with the graphical document under evaluation with one or more image files associated with the one or more stored graphical documents.

38. The method of claim 29, wherein the graphical document under evaluation is associated with an advertising entity; and
the graphical document under evaluation is compared with one or more graphical documents associated with a same advertising entity.

39. The method of claim 29, further comprising comparing at least one of an image, animation, and sound of the graphical document under evaluation with at least one corresponding image, animation, and sound of the one or more stored graphical documents.

40. The method of claim 29, further comprising comparing at least one of the color scheme, objects, text, size, shape, formatting, file type, and source of the graphical document under evaluation with a corresponding color scheme, objects, text, size, shape, formatting, file type, and source of the one or more stored graphical documents.

41. The method of claim 29, wherein the one or more stored graphical documents are formatted in a common file type; and
where the graphical document under evaluation is converted to the common file type prior to comparing.

42. A computer-implemented method comprising:
  comparing graphical content of a first graphical document to graphical content of at least one approved graphical document, the at least one approved graphical document having graphical content approved for display with publisher content by a processor;
  approving the first graphical document for distribution if the comparison indicates a substantial match between graphical content of the first graphical document and graphical content of the at least one approved graphical document; and
  delivering the first graphical document to a requestor for publishing upon approving the first graphical document by the processor.

43. A computer-readable medium encoded with computer program code to approve a graphical document, the program code effective to perform the following:
  store a first graphical document;
  compare graphical content of the first graphical document to graphical content of a second graphical document by a processor;
  flag the first graphical document based on the comparison;
  provide the flagged first graphical document to one or more evaluator terminals for rating information; and
  approve or disapprove the flagged first graphical document based on the rating information received from the one or more evaluator terminals by the processor.

44. The computer-readable medium of claim 43, further comprising flagging the first graphical document if the second graphical document contains material identified as objectionable and the graphical content of the first graphical document is substantially identical to the graphical content of the second graphical document.

45. The computer-readable medium of claim 43, further comprising flagging the first graphical document if the comparison indicates that the first graphical document contains material identified as objectionable.

46. The computer-readable medium of claim 43, further comprising disapproving the first graphical document if the rating information contains a predetermined number of negative ratings from the one or more evaluator terminals.

47. The computer-readable medium of claim 43, wherein the first graphical document contains graphical content having one or more links; and
  an operating status of the one or more links is determined and the first graphical document is disapproved if the operating status indicates at least one broken link.

48. The computer-readable medium of claim 43, further comprising flagging the first graphical document if the first graphical document contains less than a minimum number of ratings, is rated with a rating indicative of content identified as objectionable or one or more broken links, or is associated with a particular class of advertising model.

49. The computer-readable medium of claim 43, further comprising:
  associating the first graphical document with one or more keywords or concepts; and
  delivering the first graphical document, after approval, to a requestor requesting a document associated with the one or more keywords or concepts.

50. A computer-readable medium encoded with computer program code to approve a graphical document, the program code effective to perform the following:
  store one or more graphical documents;
  store content rating information associated with the one or more stored graphical documents;
  compare graphical content of a graphical document under evaluation with graphical content of the one or more stored graphical documents to identify a matching graphical document by a processor; and
  grant a distribution approval to the graphical document under evaluation based on the match and content rating information associated with the matching graphical document by the processor.

51. The method of claim 50, wherein:
  indicating, by the content rating information, a presence of content identified as acceptable or objectionable; and
  denying distribution of the graphical document under evaluation if the content rating information associated with the matching graphical document indicates the presence of content identified as objectionable.

52. The method of claim 51, further comprising granting the distribution approval to the graphical document under evaluation if the content rating information associated with the matching graphical document indicates the presence of content identified as acceptable.

53. The method of claim 52, further comprising:
  receiving one or more negative ratings from one or more users associated with the graphical document under evaluation;
  presenting the graphical document under evaluation to an evaluator terminal; and
  receiving rating information associated with the graphical document under evaluation from the evaluator terminal.

54. The method of claim 53, further comprising granting the distribution approval based on at least one of the content rating information associated with the matching graphical document and the rating information received from the evaluator terminal indicative of an absence of content identified as objectionable.

55. The system of claim 50, wherein:
  at least one of the stored graphical documents includes an approved advertisement image; and
  further comprising:
  identifying the approved advertisement image as the matching graphical document if the graphical content of the graphical document under evaluation is substantially identical to graphical content of the approved advertisement image; and
  granting the distribution approval the first graphical document based on content rating information associated with the approved advertisement image.

56. The method of claim 50, further comprising:
  associating the graphical document under evaluation with one or more keywords; and
  receiving an advertisement request associated with a concept, and serve the graphical document under evaluation after the distribution approval is granted based on a correlation between the concept and the one or more keywords.

57. The method of claim 56, wherein the advertisement request includes a search query.

58. The method of claim 50, further comprising comparing one or more image files associated with the graphical document under evaluation with one or more image files associated with the one or more stored graphical documents.

59. The method of claim 50, wherein the graphical document under evaluation is associated with an advertising entity; and
  the graphical document under evaluation is compared with one or more graphical documents associated with a same advertising entity.

60. The method of claim 50, further comprising comparing at least one of an image, animation, and sound of the graphical document under evaluation with at least one corresponding image, animation, and sound of the one or more stored graphical documents.

61. The method of claim 50, further comprising comparing at least one of the color scheme, objects, text, size, shape, formatting, file type, and source of the graphical document under evaluation with a corresponding color scheme, objects, text, size, shape, formatting, file type, and source of the one or more stored graphical documents.

62. The method of claim 50, wherein the one or more stored graphical documents are formatted in a common file type; and where the graphical document under evaluation is converted to the common file type prior to comparing.

63. A computer-readable medium encoded with computer program code to approve a graphical document, the program code effective to perform the following:

compare graphical content of a first graphical document to graphical content of at least one approved graphical document, the at least one approved graphical document having graphical content approved for display with publisher content by a processor;

approve the first graphical document for distribution if the comparison indicates a substantial match between graphical content of the first graphical document and graphical content of the at least one approved graphical document by the processor; and deliver the first graphical document to a requestor for publishing upon approving the first graphical document.

* * * * *

UNITED STATES PATENT AND TRADEMARK OFFICE
CERTIFICATE OF CORRECTION

Page 1 of 1

PATENT NO.       : 8,014,634 B1
APPLICATION NO.  : 12/686281
DATED            : September 6, 2011
INVENTOR(S)      : Wesley T. Chan It is certified that error appears in the above-identified patent and that said Letters Patent is hereby corrected as shown below:

Column 1, Line 7-8, After "application of" please delete "co-pending".

Claim 13, Column 24, Line 6, After "approval" please insert --to--.

Claim 34, Column 26, Line 30, After "approval" please insert --to--.

Claim 55, Column 28, Line 45, After "approval" please insert --to--.

Signed and Sealed this
First Day of May, 2012

David J. Kappos
*Director of the United States Patent and Trademark Office*